United States Patent [19]

Wener et al.

[11] 4,405,036

[45] Sep. 20, 1983

[54] SEAFLOOR VELOCITY AND AMPLITUDE MEASUREMENT APPARATUS METHOD

[75] Inventors: Kenneth R. Wener, Littleton, Colo.; James F. Huff, Sugar Land, Tex.; Anthony R. Tinkle, Littleton, Colo.

[73] Assignee: Marathon Oil Company, Findlay, Ohio

[21] Appl. No.: 215,591

[22] Filed: Dec. 11, 1980

[51] Int. Cl.³ ............................. G01V 1/16; G01V 1/38
[52] U.S. Cl. ...................................... 181/110; 181/401; 181/120; 367/15
[58] Field of Search ................. 367/14, 15, 27, 28, 367/56–57; 181/108, 110, 114, 118, 120, 401; 166/249, 250

[56] References Cited

U.S. PATENT DOCUMENTS

| | | | |
|---|---|---|---|
| 2,691,939 | 10/1954 | Hintze | 181/401 |
| 2,717,656 | 9/1955 | Bannister | 181/110 |
| 2,792,067 | 5/1957 | Peterson | 181/112 |
| 2,866,512 | 12/1958 | Padberg | 367/56 |
| 2,953,214 | 9/1960 | Merten | 365/57 |
| 3,034,596 | 5/1962 | Thompson | 181/401 |
| 3,164,799 | 1/1965 | Mirasia | 181/401 |
| 3,219,968 | 11/1965 | Loper et al. | |
| 3,274,608 | 9/1966 | Ewing et al. | |
| 3,350,683 | 10/1967 | Sengbush | |
| 3,371,310 | 2/1968 | Silverman | 367/57 |
| 3,373,400 | 3/1968 | Epstein et al. | 367/15 |
| 3,441,901 | 4/1969 | Cawley et al. | |
| 3,504,756 | 4/1976 | Peterson | 181/108 |
| 3,561,546 | 2/1971 | Craig | 181/110 |
| 3,572,462 | 3/1971 | Gray | 181/110 |
| 3,644,882 | 2/1972 | Burg | |
| 3,690,164 | 9/1972 | Gibillard et al. | 367/14 |
| 3,831,136 | 8/1974 | Sagoci | |
| 4,016,531 | 4/1977 | Cook et al. | |
| 4,079,353 | 3/1978 | Jenkinson | |
| 4,103,756 | 8/1978 | Trulio et al. | 181/401 |
| 4,186,373 | 1/1980 | Thompson | 181/108 |

*Primary Examiner*—Nelson Moskowitz
*Attorney, Agent, or Firm*—Jack L. Hummel

[57] ABSTRACT

The invention provides an apparatus (10) and method for measuring the velocity and amplitude of a pressure wave (310) from an acoustic pulse (300) through layers of sediment (140) located below the mudline (130) of the seafloor (120). The apparatus (10) includes an implosive seismic source (30) for injecting acoustic pulses (300) into a region of the sediments (140), a plurality of vertically spaced sensors (50) located vertically below the seismic source (30) for sensing when the pressure waves (130) from the acoustic pulses (300) impact the sensor (50) or the amplitude of the pressure wave (310), and a digital recording system (100) for recording the signals from the sensors (50).

5 Claims, 7 Drawing Figures

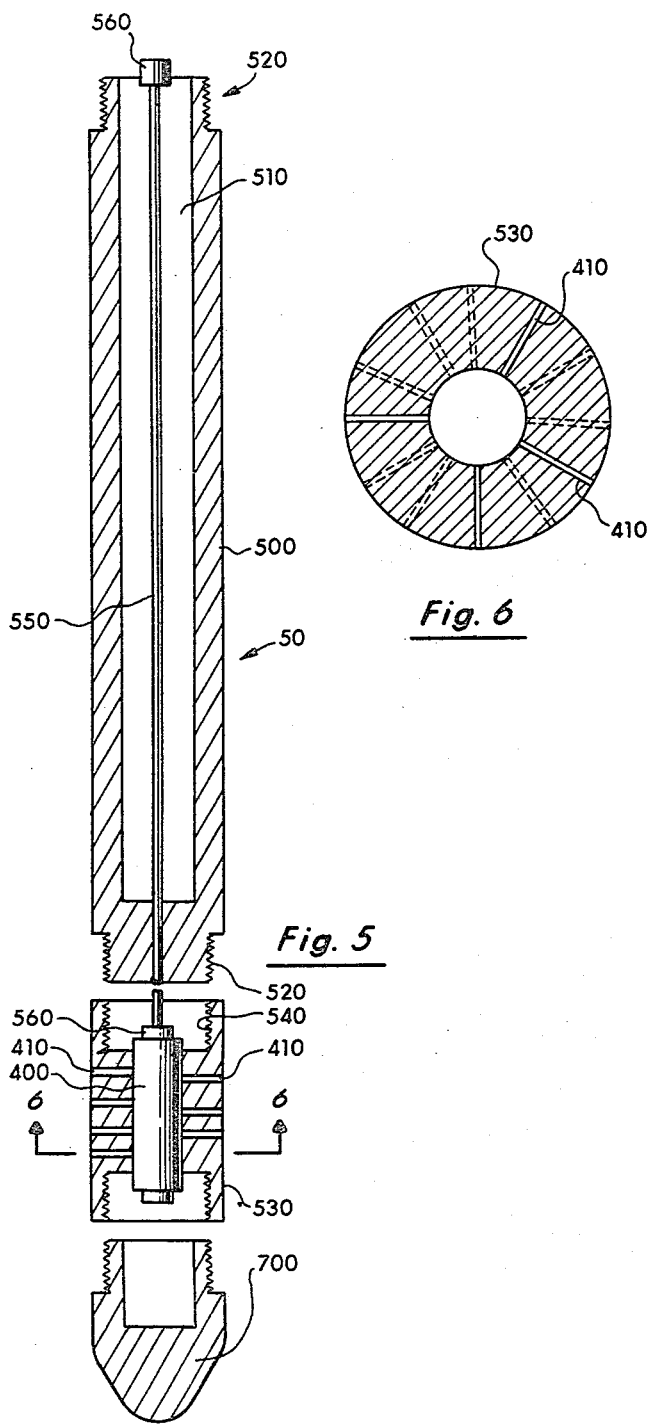

SEAFLOOR VELOCITY AND AMPLITUDE MEASUREMENT APPARATUS METHOD

TECHNICAL FIELD

The present invention relates to methods and apparatuses measuring acoustic wave velocities and amplitudes in the sediments of the seafloor and, more particularly, to methods and apparatuses which measure acoustic velocities and amplitudes through vertical layers of sediment.

BACKGROUND ART

As the result of the present invention, the following prior art approaches were uncovered:

| Inventor | Ser. No. | Date |
| --- | --- | --- |
| Avedik et al | 4,138,658 | Feb. 6, 1979 |
| Joseph C. Gray | 3,572,462 | Mar. 30, 1971 |
| L. R. Padberg, Jr. | 3,514,749 | May 26, 1970 |
| S. Epstein et al | 3,373,400 | Mar. 12, 1968 |
| A. J. Hintze | 2,691,939 | Oct. 19, 1954 |

The 1968 patent to Epstein et al (U.S. Pat. No. 3,373,400) is an apparatus and process for determining certain geophysical properties, such as sound velocity, in the ocean bottom. In Epstein, a series of explosive charges are detonated in a predetermined order at spaced time intervals in order to permit discrete recordation of the bubble pulse characteristics of each detonation. One explosive charge occurs above the seafloor, a second explosive charge occurs on the seafloor, and a third explosive charge occurs under the seafloor. A hydrophone is utilized on the surface of the sea to receive the resulting explosive shock and wave forms. The Epstein approach utilizes an apparatus for embedding the third charge into the seafloor and is not adapted to be reused for different measurements being totally self destructive.

The 1971 patent issued to Gray (U.S. Pat. No. 3,572,462) sets forth an apparatus for use in seismic explorations wherein an artificial shock wave is created from an energy source on the seafloor being directed into the seafloor for reflection from a sub-surface formation. Receipt of the reflection from the sub-surface formation occurs in an energy receptor which is located separately and remote from the energy source. Such apparatus and method of Gray is not suitable for determining the geophysical properties of the layers of the sediment near the seafloor. The advantage of the Gray approach over other similar approaches lies in its ability to provide substantially vertical (or normal) reflection from the energy source through to the substrata and back into the receptor rather than using oblique reflection.

The 1954 patent issued to Hintze (U.S. Pat. No. 2,691,939) relates to an apparatus for planting an explosive charge below the seafloor. The 1979 patent issued to Avedik et al (U.S. Pat. No. 4,138,658) sets forth a seismograph for use on the seafloor. And, the 1970 patent issued to Padberg, Jr. (U.S. Pat. No. 3,514,749) relates to a method and apparatus for conducting seismic explorations from aircraft. The Padberg, Jr. apparatus has for its purpose to measure the existence of subsurface discontinuities.

Only the Epstein approach is adopted for generating data concerning the geophysical properties of local regions of the seafloor. None of the other prior patented approaches provide such data.

As will be presented in the following, the seafloor velocity and amplitude measurement apparatus and method of the present invention generates data on the various layers in the near seafloor region of the sediments utilizing an approach different from Epstein (expansion of a gas bubble). And, one that generates an acoustic pulse in the sediments and analyzes the resulting pressure wave from the pulse at a point in the sediments vertically below the generation of the acoustic pulse. Epstein, to the contrary, receives his data at a point on the surface of the ocean generally obliquely located from the explosive sources. None of the prior art approaches discuss measurement of the amplitude of the received pressure wave.

DISCLOSURE OF INVENTION

The problem faced in measuring pressure wave velocities and amplitudes from acoustic pulses in various sedimentary layers of the seafloor is to formulate an apparatus and method for measuring the vertical velocity of the pressure wave through different layers of sediment at different discrete locations in the sediments. The problem is further complicated in that it is desired in order to obtain accurate data, to generate a series of acoustic pulses in the sediments and to receive the pressure wave from each pulse also in the sediments without extending the pressure wave over long distance and through other mediums as occurs in prior approaches.

The seafloor velocity measurement apparatus and method of the present invention provides a solution to the problem and includes a seismic source for injecting a number of acoustic pulses in a region near the mud-line of the seafloor, a reference sensor located at the mud-line of the seafloor for providing a reference signal, and a plurality of vertically interconnected sensors embedded into the various layers of sediment on the seafloor which produce pressure signals in response to receipt of the vertically directed pressure wave from each acoustic pulse. Each vertically interconnected sensor includes an acoustic detector mounted on the interior of the sensor having a plurality of randomly spaced vents disposed around the sensor providing fluid access from the layers of sediment to the outer surface of the acoustic detector. When the seismic source injects the acoustic pulse in the sediments, the vertically traveling pressure wave is affected by the nature and characteristics of the layers of sediment and the time the pressure wave takes to travel to each vertical sensor and how antennuated the signal becomes produces information characteristics of the layers of sediment.

The method of measuring velocity through the sediments on the seafloor includes the step of injecting acoustic pulses near the mud-line, measuring the velocity of the pressure wave at a reference location located on the mud-line located a predetermined fixed distance away and measuring the velocity of the pressure wave at a plurality of known substantially vertical distances in the sediments below the location of the injected pulses.

In comparison to the conventional prior art approaches, none of the prior art approaches set forth an apparatus or a method whereby the pressure wave from an acoustic pulse is delivered downwardly and is sensed at a location substantially vertically and below the source of the acoustic pulse. Furthermore, none of the above prior art approaches set forth an approach for determining the character of the various layers of the sediment in the seafloor based upon discrete acoustical readings at different levels in the sediments.

BRIEF DESCRIPTION OF THE DRAWING

FIG. 5 is a cross-sectional side view of a sensor of the present invention;

FIG. 6 is a cross-sectional view taken along lines 6—6 of FIG. 5; and

FIG. 7 is an illustration of the preferred embodiment showing three vertically interconnected sensors.

BEST MODE FOR CARRYING OUT THE INVENTION

Figure 1:
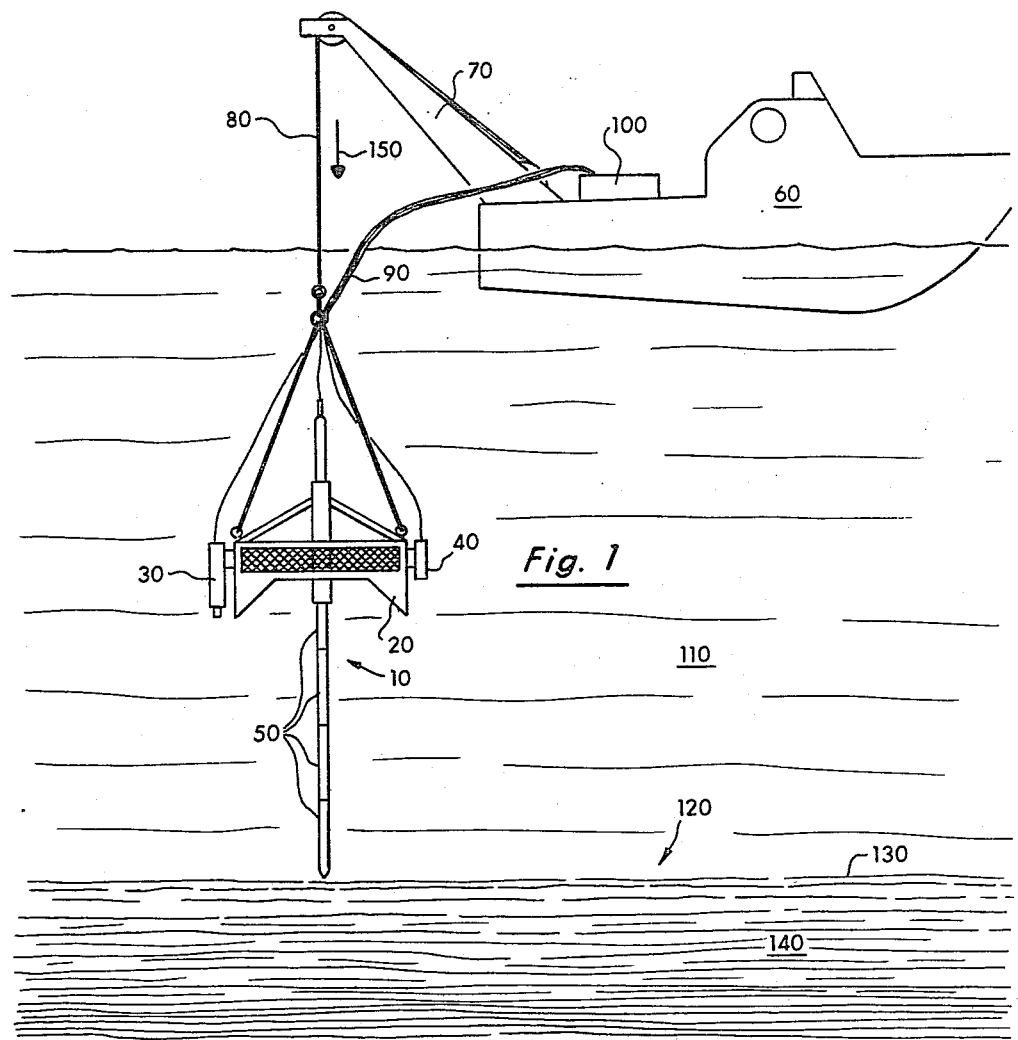
FIG. 1 sets forth an illustration of the apparatus of the present invention being located above a desired testing location in the seafloor.

The apparatus of the present invention 10 shown in FIG. 1, includes a ballast 20, a seismic source for injecting an acoustic pulse 30, a reference sensor 40, and a plurality of vertically interconnected spaced sensors 50. A conventional boat 60 carries a crane 70 which by means of cable 80 is used to position the apparatus 10 of the present invention. A communications cable 90 interconnects the seismic source 30, the reference sensor 40, and the plurality of vertically interconnected sensors 50 with a set of recording electronics 100 located on the boat 60.

As shown in FIG. 1, the present invention is positioned in the water 110 over the seafloor 120. The seafloor consists of a mud-line 130 and a number of layers of sediment generally designated 140. These layers of sediment 140 range in viscosity from low to high or from a thick fluid to a gelatin-like composition. The mud-line 130 provides a point of reference between the water 110 and sediments 140 although it is to be expressly understood that the transition between the liquid 110 and the sediment 140 is often unclear.

Figure 2:
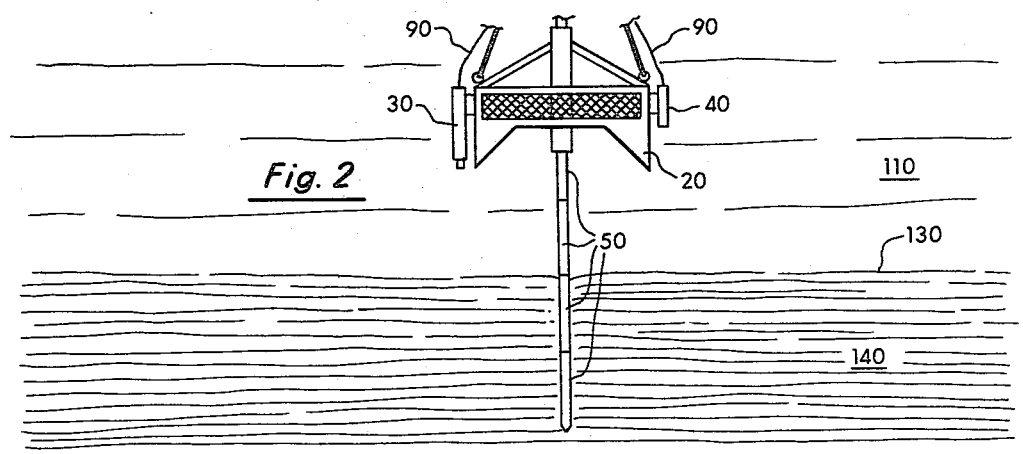
FIG. 2 sets forth an illustration of the apparatus of the present invention being embedded into the sediment layers of the seafloor.
Figure 3:
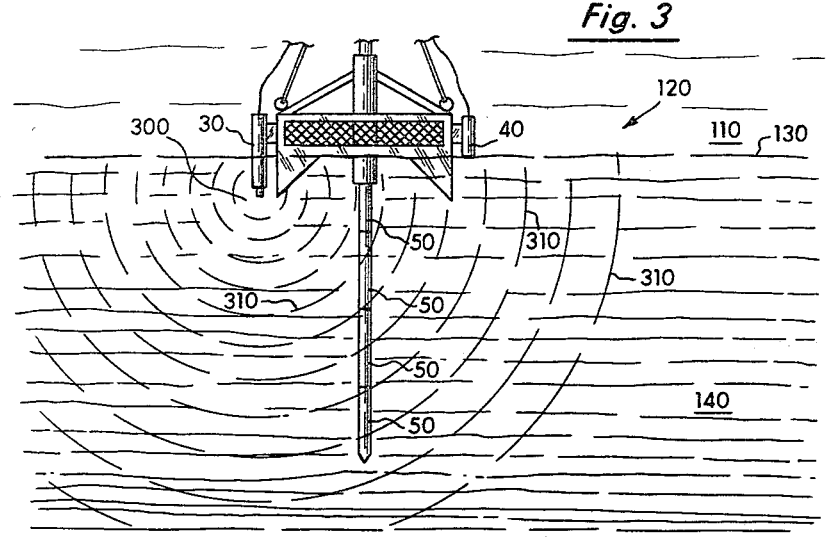
FIG. 3 is an illustration of the apparatus of the present invention being fully embedded into the sediment layers of the seafloor.

FIGS. 1 through 3 illustrate the placement of the apparatus 10 of the present invention into the layers of sediment 140 on the seafloor 120. In FIG. 1, the apparatus 10 of the present invention is carried by the boat 60 to a desired location. At that desired location, the ballast 20 is lowered in the direction of arrow 150. As shown in FIG. 2, the weight of the ballast 20 causes the vertically spaced sensors 50 to be embedded into the layers of sediment 140 until, as shown in FIG. 3, the ballast rests on the seafloor 120. When fully embedded, the seismic source 30 is selectively activated to provide an acoustic pulse designated 300. A pressure 310 created by the acoustic pulse 300 travels through the sediments 140.

The ballast 20, as shown in FIGS. 1 through 3, is conventionally available from McClelland Engineers, 6440 Hillcroft, Houston 77081, U.S.A. and is commercially available as the HALIBUT Stabilizing Ballast Collar. The McClelland Ballast Collar is typically 2,000 pounds in weight and is approximately 120 centimeters square. It is manufactured from welded steel and is utilized by McClelland Engineers for providing soil shear strength measurements in soft, near-seafloor sediments from 0.6 meters to 6.0 meters penetrations. The McClelland Ballast Collar has been modified by removing the soil shear strength measuring apparatuses and by affixing the seismic source 30, the reference sensor 40, and the vertical sensors 50 to the ballast 20. The McClelland Ballast 20 was selected because it is a convenient weight for the crane 70 and the boat 60 to handle and yet represents a sufficient weight to provide approximately 9 meters of penetration for the vertical sensors 50. It is to be expressly understood that any conventional ballast could be utilized in the teachings of the present invention.

The seismic source 30 is also conventionally available from Seismic Systems Incorporated, 6300 Hillcroft, Suite 610, Houston, Texas 77081, as the T Water Gun. The T Water Gun is an implosive pneumatic seismic source which provides a sharp stable impulse without any undesirable bubble effects. The T Water Gun can fire an acoustic pulse approximately every eight seconds and operates at 2100 psi. Air and the necessary electrical signals for firing and operation are delivered to the seismic source through communications cable 90. It is to be expressly understood that any suitable seismic source could be utilized under the present teachings.

Figure 4:
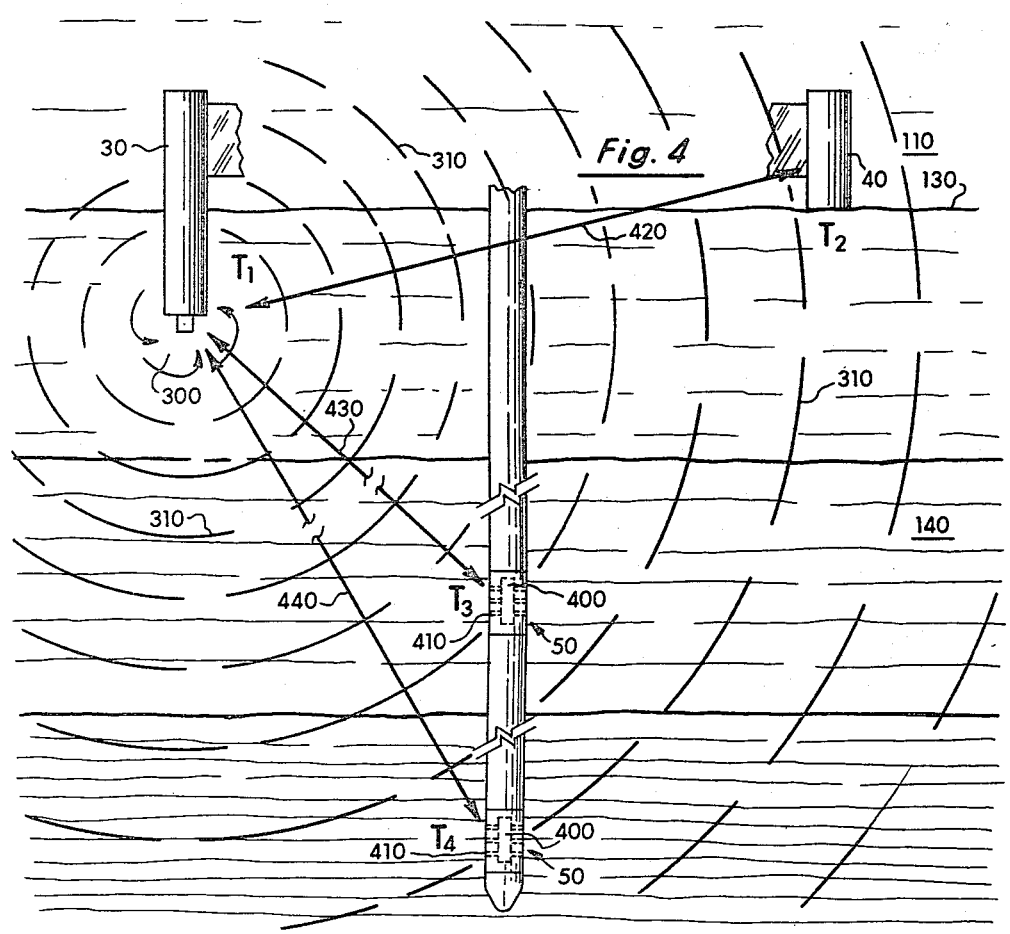
FIG. 4 illustrates the measurement of the velocity of the pressure wave created by the injection of an acoustic pulse into the sediment layers of the seafloor.

The acoustic detectors 400, shown in FIG. 4, contained in sensor 40 and vertical sensors 50 is conventionally available from Refraction Technology, Inc., 735 North Britain Road, Irving, Texas 75061, as Model No. REF-TEK17. This conventionally available detector is a low impedance hydrophone utilizing a ceramic element in an insulated epoxy housing. It contains a self-contained battery to power the preamplifiers for approximately one year. Again, any suitable hydrophone could be utilized under the teachings of the present invention. Each acoustic detector 400 contains a preamplifier, not shown, which can be individually calibrated and which can be adjusted to operate with different sensitivities.

As shown in FIGS. 3 and 4, the apparatus 10 of the present invention operates to determine the vertical character of the sediments 140 by measuring the acoustic velocity and amplitude of a pressure wave through the sediments.

It is to be noted that the drawing is not drawn to scale. In the preferred embodiment the seismic source 30 is located approximately 60 centimeters (2 feet) on the horizontal, from the top of the vertically interconnected sensors 50. Yet, the first acoustic detector 50 is located approximately 300 centimeters (10 feet) vertically down. Each successive acoustic detector is located an additional 300 centimeters down. In the preferred embodiments, three sensors 50 can be used and, therefore, the lowest acoustic detector is approximately 900–1500 centimeters (30 to 50 feet) vertically below the seismic source 30.

The seismic source 30 can be located on the ballast 20 just below the mud-line 130 as shown in the drawing, at the mud-line 130, or just above the mud-line 130 to operate effectively. In operation and as shown in FIG. 4, at a predetermined time, $T_1$, the seismic source 30 generates an acoustic signal 300 which in turn creates a pressure wave front 310 which travels outwardly from the seismic source 300. The wave 310 initially impacts on the reference sensor 40 which is located at mud-line 130 at time $T_2$. The wave front 310 quickly passes through the fluid or water medium 110, at a velocity of 1500 meters per second (5000 feet per second) to impact the reference sensor 40. The acoustic detector in the sensor 40 is calibrated and set for low sensitivity. At time $T_3$, the wave front 310 impacts upon the first vertical sensor 50. At $T_4$, the seismic wave 310 impinges upon the next vertical sensor 50 and so on.

As illustrated in FIG. 4, each sensor 40 and 50 is located a predetermined distance from the seismic source 30. This fixed geometry is required to evaluate the geophysical information—reference sensor 40 is located a distance designated by arrow 420, the first reference sensor 50 is separated by a distance designated by arrow 430 and the second vertical sensor 50 is separated by a distance designated by arrow 440. With knowledge of these distances, and with knowledge of when the acoustic signal 300 is generated at time, $T_1$, the velocity through the sediments 140 to the reference sensor 40 and sensors 50 can be ascertained. The acoustic velocity through the sediments provides information as to the vertical geophysical characteristics of the sediments.

Since each acoustic detector 400 is calibrated and since each acoustic sensor detector 400 at different vertical locations can have different sensitivities, the amplitude of the pressure wave when impacting each detector 400 can be measured. By measuring the velocity of the pressure wave which is dependent upon the fixed geometry and by detecting the amplitude of the pressure wave important information as to the character of the sediments can be ascertained. In typical operation, the seismic source 30 is fired ten to twenty times and the velocity and amplitude readings are statistically analyzed.

As can be observed in FIGS. 1 through 4, the apparatus 10 of the present invention is not self-destructive and can be reused for different locations. Typically thirty to sixty minutes transpires in the lowering of the apparatus 10 into the sediments, taking of the measurements, and raising of the apparatus.

The interconnected vertical sensors 50 are detailed in FIGS. 5 through 7. In FIG. 5, one sensor 50 is shown to include a support or pipe 500 having a hollow interior 510 and threaded ends 520. On one of the threaded ends 520 is mounted an extension 530 on the interior of which is contained the acoustic detector 400. The extension 530 has a plurality of formed vents 410 disposed around the outer surface of the acoustic detector 400. The extension has correspondingly formed female threads 540 which receive the threaded end 520 of the support 500. The acoustic detector 400 is electrically interconnected to an electrical cable 550 which has water proof electrical connectors 560 at either end. Electrical cable 550 interconnects with the acoustic detector 400 by means of a water proof connector 560 and the cable 650 forms a part of the overall communications cable 90. Each sensor 50 includes a support 500, an extension 530, the detector 400, and the cable 550 and is capable of vertical interconnection with other sensors 50.

In FIG. 6 is shown a cross-section of the sensor 50 through the acoustic detector 400 illustrating the arrangement of the vents 410 in a random fashion about the surface of the detector 400.

As shown in FIG. 7, the sensors 50 can be vertically interconnected one with the other so that the acoustic detectors 400 are spaced from each other at predetermined fixed intervals such as 300 centimeters (10 feet). Electrical interconnection can be preserved through interconnections on opposing ends of detector 400 by electrical cable 550. A tool end cap 700 is provided on the last sensor 50. Under the teachings of this invention any number of acoustic detectors 400 can be used being spaced from each other at the same or different distances.

The method of the present invention is shown in FIGS. 1 through 4. In broad summary, and as shown in FIGS. 3 and 4, the ballast 20 embeds the vertically interconnected sensors 50 into the sediments 140. At a first predetermined time, $T_1$, the seismic source 30 injects an acoustic pulse 300 into the sediments 140. The velocity and amplitude of the resulting pressure wave 310 as it impacts on the vertical sensors 50 and the reference sensor 40 is measured. The electronics 100 contained in the boat 60 are conventional and are used to measure the elapsed times. In the preferred embodiment each sensor 40 and 50 as well as the seismic source 30 are interconnected with the conventional digital magnetic tape recording system and the times can be determined. By increasing the weight of the ballast more vertically interconnected sensors can be embedded deeper into the sediments.

The apparatus and method of the present invention have been specifically set forth in the above disclosure, but it is to be understood that modifications and variations to both the method and apparatus can be made which would still fall within the scope and coverage of the appended claims herewith.

We claim:

1. An apparatus (10) operative with a crane (70) on a vessel (60) on the sea (110) for penetrating the mudline (130) of the sea-floor (120) and for measuring the substantial vertical velocity of the pressure wave (310) from an acoustic pulse (300) through the different layers of sediments (140) located directly below the mudline (130), said apparatus comprising:

a ballast (20) operatively connected to said crane (70), means (30) located on said ballast (20) for providing said acoustic pulse (300), a plurality of rigidly interconnected vertical sensors (50) connected to said ballast (20) and extending downwardly therefrom predetermined substantially vertical distances from said providing means (30) for sensing the substantial vertical velocity of said pressure wave (310) at different vertical locations in said sediments, said ballast (20) having sufficient weight to embed said sensors (50) downwardly into said sediments when lowered by said crane (70) and to place said providing means (30) into a region near said mudline (130) and above said sediments (140) to be measured, each of said sensors (50) being capable of generating an electrical signal (550) in response to said sensed substantial vertical velocity of said pressure wave (310), and means (100) located on said vessel (60) receptive of said electrical signals (550) from said sensors (50) and based upon the values of the aforesaid predetermined substantially vertical distances for measuring the substantial vertical velocity of said pressure wave (310) through said layers of sediment (140) between said providing means (30) and said sensors (50).

2. The apparatus of claim 1 wherein each one of said plurality of interconnected vertical sensors (50) comprises:

an elongated support (500 and 530), an acoustic detector (400) mounted in the interior (510) of said support (530), said support (500 and 530) having a plurality of formed vents (410) around the outer surface of said acoustic detector (400) for extending said pressure wave (310) through said support (530) to said acoustic detector (400) and, means (520 and 540) for selectively engaging one end of said support to the next innerconnected vertical sensor.

3. The apparatus of claim 2 wherein the plurality of formed vents (410) are oriented in said support (530) around said outer surface of said acoustic detector (400).

4. The apparatus of claim 1 further comprising:
a reference sensor (40) substantially located at said mudline (130) connected to said ballast (20) and substantially spaced from said providing means (30) for sensing said pressure wave (310) from said acoustic pulse (300) for generating a reference signal (90), and, said measuring means (100) being further receptive of an electrical signal from said reference sensor (40) for determining the substantial horizontal velocity and amplitude of said pressure wave (310) through said sediment (140) between said providing means (30) and said reference sensor (40).

5. An apparatus (10) operative with a crane (70) on a vessel (60) on the sea for penetrating the mudline (130) of the seafloor (120) and for measuring the substantial vertical velocity and amplitude of a pressure wave (310) from an acoustic source (300) through the different layers of sediments (140) located directly below the mudline (130), said apparatus comprising:
a ballast (20) operatively connected to said crane (70),
means (30) located on said ballast (20) for providing said acoustic pulse (300),
a plurality of rigidly interconnected vertical sensors (50) connected to said ballast (20) and extending downwardly therefrom predetermined substantial vertical distances from said providing means for sensing the substantial vertical velocity and amplitude of said pressure wave (310) at different vertical locations in sediments, each of said sensors (50) comprising:
(a) an elongated support (500 and 530),
(b) an acoustic detector (400) mounted in the interior (510) of said support (530), said support (500 and 530) having a plurality of formed vents (410) around the outer surface of said acoustic detector (400) for extending said pressure wave (310) through said support (530) to said acoustic detector (400), and
(c) means (520 and 540) for selectively engaging one end of said support to the next interconnected vertical sensor,
a reference sensor (40) connected to said ballast (20) a predetermined substantially horizontal distance from said providing means (30) for sensing said pressure wave (310) from said providing means (30) and for generating a reference electrical signal (90),
said ballast (20) having sufficient weight to embed said vertical sensors (50) downwardly into said sediments and to place said providing means (30) and reference sensor (40) into a region near said mudline (130) and above said sediments (140) to be measured, each of said vertical sensors (50) being capable of generating an electrical signal (550) in response to said sensed substantial vertical velocity and amplitude of said pressure wave, and
means (100) located on said vessel (60) and based upon the values of the aforesaid predetermined substantially vertical distances and the value of the aforesaid predetermined substantially horizontal distance and further receptive of said electrical signals (550) from said vertical sensors (50) and of said reference electrical signal (90) from said reference sensor (40) for measuring the substantial vertical velocity and amplitude of said pressure wave (310) through said layers of sediment (140).

* * * * *